United States Patent Office 3,418,204
Patented Dec. 24, 1968

3,418,204
POLYALKYLENE IMINE PARTIALLY CROSS-LINKED WITH FORMALDEHYDE AND PIGMENT RETENTION IN PAPER-MAKING THEREWITH
Albert Goldstein, New Shrewsbury, and Donald R. Hobbs, Jamesburg, N.J., assignors to Chemirad Corporation, East Brunswick, N.J., a corporation of Delaware
No Drawing. Filed Aug. 4, 1965, Ser. No. 477,301
7 Claims. (Cl. 162—164)

ABSTRACT OF THE DISCLOSURE

An anchoring agent for bonding pigments and polyolefins to cellulosic materials, the anchoring agent formed by cross-linking polyalkylene imines with sufficient formaldehyde to react with from about one-half to three-quarters of the —NH— groups in the polyalkylene imine. Improving pigment retention in cellulosic fibrous materials by reacting with the anchoring agent.

This invention relates to articles having therein an added coloring component, hereinafter generally called a pigment regardless of its composition, concerning especially modification of such articles for better pigment retention and other purposes, and relates particularly to agents designed for such purposes.

For the sake of illustration of the pigment-retention features of this invention, paper will be referred to as an example of a common pigmented article to which the present invention applies. Papers for this purpose comprise a major, structural component, usually wholly or principally cellulosic fibers, and a minor, pigmenting component, of course, and include also a pigment-retention agent of this invention and other, optional minor components, such as binders, emulsifiers, fillers, and sizes, with which we are not too concerned. Other fundamentally fibrous sheetlike materials such as cardboard, hardboard, and fiber-reinforced resinous material are similarly subject to the pigment-retention aspects of this invention. Suitable non-fibrous materials may be selected from other sheetlike, filamentary, and cellular articles of various compositions, such as are recited hereinafter in connection with another aspect of the invention.

Loss, especially uneven or uncontrolled loss, of pigmenting material from a fibrous slurry before or during extraction of liquid therefrom or even afterward may produce troublesome variation of color from one sheeting run to another or within a single run. Recovery of the lost pigment is often impractical and is expensive at best, as is nonrecovery of it, of course.

A primary object of the present invention is improved pigment retention in paper and other materials in which pigment is added during manufacture.

Another object is provision of pigment-retention agents having novel solubility characteristics.

A further object is utilization of a preferred pigment-retention agent as an anchor coating on substrates for the production of bonded composite or laminated articles.

Other objects of this invention, together with means and methods for attaining the various objects, will be apparent from the following description, which is exemplary rather than limitative.

In general, the objects of the present invention are accomplished, in a pigmented article, by means of pigment-retention agents comprising polyalkylenimines cross-linked to a partial or only minor extent, soluble in water or low alkanol (or mixture therereof) upon preparation and insoluble therein after removal of the solvent. Thus, for example, where the pigmented article is paper or the like prepared from a fibrous slurry, selected polyalkylenimine dissolved in such solvent is mixed, and thereupon reacted with, a considerably less than equimolar quantity of selected cross-linking agent; the resulting solution of partially cross-linked polyalkylenimine reaction product is mixed with the pigmented slurry or with the pigment itself, the resulting mixture then being added to the slurry; and the slurry is cast in sheet form and dried conventionally to leave both the pigment and a solid residue of the reaction product dispersed throughout the resulting paper sheet.

Polyalklenimines suited to the practice of this invention include homopolymers of ethylene imine, propylene imine, and butylene imine, and copolymers or interpolymers thereof with one another. Such suitable polymers may be formed by conventional polymerization procedures well known in the art and are articles of commerce that may be purchased already polymerized. Suitable degrees of polymerization are difficult to specify absolutely, although they can be determined relatively readily enough in terms of solubility and viscosity by persons skilled in the art. For example, polyethylenimine having a kinematic viscosity of one centipoise when measured as a one percent aqueous solution at 20° C. is suitable and for convenience is meant whenever the abbreviation PEI is used hereinafter.

Suitable solvents for the polymer, both before and after the specified partial or minor degree of cross-linking, include methanol, ethanol, and isopropanol as examples of lower alkanols useful instead of or in addition to water. The cross-linking agent preferably is supplied dissolved therein also but may be added directly to the polymer solution if desired. Such solutions may be acidified, as by inclusion of a small amount of hydrochloric acid, or may include other ingredients.

Suitable as cross-linking agents for the polyalkylenimine are lower aliphatic ketones and aldehydes, saturated and unsaturated (e.g., acetone, acetaldehyde, acrolein). A preferred cross-linking agent is formaldehyde. Other appropriate cross-linking agents include polyfunctional compounds, such as polyhalohydrins, polyisocyanates, polyepoxides, and polyaziridinyl compounds (e.g., epichlorohydrin, hexamethylene diisocyanate, polyvinylcyclohexene dioxide, tris-(1-aziridinyl) phosphine oxide); also unsaturated carboxylic acids and their reactive derivatives, such as chlorides and esters, e.g., acrylic acid, acrylochloride, acrylates). The cross-linking agent is used in considerably less than equivalent quantity (or equimolar ratio with respect to the component alkylenimine mer) to leave at least one-fourth, and preferably one-half or somewhat more of the NH groups in the polymer unreacted. Thus, for each gram of PEI, which is characterized by a "molecular" weight of 43 for the mer $CH_2CH_2NH$, an amount of three-fourths gram of formaldehyde (mol. wt. 30) would leave, upon complete reaction, about one-half of the NH groups unreacted. If desired, an excess of unreacted polyalkylenimine may be added to the solution of partially cross-linked polymeric reaction product to increase the overall average frequency of unreacted NH groups.

Pigments with which the pigment-retention agents of this invention are useful may be of nearly any kind, inorganic or organic. Examples are titanium dioxide, carbon black, and phthalocyanine dyestuffs. Many others will come readily to the mind of a person skilled in the art. Also included as pigments for the purpose of this invention are materials not normally considered as pigments but capable of influencing reflectivity or similar characteristics of articles containing them; examples are glass beads in the micron or tens of microns range, and chemiluminescent materials. The forces binding the pigment particles in the article are only imperfectly understood and probably vary considerably from one type of pigment to another, and we do not wish to be limited to any particular theory with regard thereto.

In the following examples, all parts and percentages are stated by weight, on a solids or dry fiber basis, unless otherwise indicated.

Example 1.

A solution made up of 65.7 parts 37% formaldehyde and 24 parts 37% hydrochloric acid in 207 parts water was added, with stirring, to a solution of 277 parts 50% aqueous solution of PEI in 200 parts water. After addition of 2.7 parts 10% hydrochloric acid the resulting solution was stirred for a quarter hour, whereupon 15 parts more of the first mentioned solution were added, the temperature range being maintained in the range of 20°–27° C. throughout. The resultant is a solution of partially cross-linked PEI reaction product useful as indicated above and in succeeding examples.

Example 2

A phthalocyanine dye (available from General Aniline & Film Corporation as Heliogen Green N Supra Paste) is diluted with water from 25% to 1% solids and is added in concentration of 0.5% to a neutral (pH 7.0) aqueous slurry of bleached hardwood kraft pulp beaten to 35° Schoepper-Riegler (SR) degree of freeness. The pigmented slurry was divided into seven samples, one of which was cast into a handsheet as a control, the resulting color thereof being a very pale green. To the other half dozen slurry samples were added in various concentrations, the modified PEI solution resulting in Example 1 (three samples) and unmodified PEI solution (three samples), all less than a minute before casting of handsheets from the respective samples. The resulting colors are indicated in the following table by the numbers from 1 (lightest) to 6 (darkest) green.

TABLE I

Modified PEI:
  2% _____ (3)
  2% _____ (2)
  10% _____ (6)
Unmodified PEI:
  2% _____ (2)
  5% _____ (1)
  10% _____ (4)

Example 3

The procedure of Example 2 was repeated except that the modified and unmodified PEI solutions were mixed with the pigment before addition of the pigment to the pulp slurry rather than being added to the slurry after addition of the pigment. The order of coloration in the resulting handsheets was the same as in Table I, but the degree of color was quite a bit lighter in each sample prepared according to the present Example; thus, the color attained by 2% modified PEI or 10% modified PEI in this Example approximated the color of the 2% unmodified PEI sample of Example 2.

Example 4

Repetition of the procedures of Examples 2 (all three concentrations) and 3 (2% concentration only) under acidic conditions (pH 4.5) in presence of 2% alum and 2% rosin size (Pexol) gave similar results except that the coloration was more intense (control also) and that the addition to pigment for subsequent addition to the pulp slurry rather than to the pigmented slurry showed less effect than under neutral conditions.

Although exemplified above in the manufacture of paper from bleached hardwood kraft pulp the pigment-retention features of the present invention are applicable also in the manufacture of paper or the like from cotton linters, jute fibers, and unbleached as well as bleached wood pulps, prepared by sulfite or soda as well as kraft process. The pigment-retention agents of this invention may be added at any convenient stage in the paper-making process, preferably early enough to ensure thorough distribution throughout the fibrous slurry. No special equipment is required.

The preferred formaldehyde-modified PEI of this invention is also useful as an agent for anchoring paper and other films, especially of smooth surface and chemically inert composition, to substrates, which themselves may be similar or dissimilar and may be flexible, as in the form of film, filament, tubing, or cellular configuration, and possibly elastomeric as well. The dissolved reaction product is applied to the substrate in a thin coating by any appropriate technique, such as immersion or spraying, and the solvent is then removed, most often by evaporation, with or without the aid of heating. The resulting solid layer of partially cross-linked polyethylenimine, which preferably barely covers the substrate surface, is sorbed securely thereto by imperfectly understood forces. The film to be bonded thereto is applied thereover in suitable manner, as from a melt or a solution thereof, or as a solid with or without the use of intervening adhesive of pressure-sensitive or other appropriate type. The resulting composite or laminated structure, which if desired may comprise a plurality of layers of the substrate or the applied film (or both), is generally found, regardless of method and materials, to be more securely bonded together than in the absence of the anchoring coating of this invention. Furthermore, so long as one of the other components employed is moisture-sensitive, i.e., susceptible to debonding in the presence of water or lower alkanol, the bond is largely insensitive thereto despite the fact that the anchoring agent was prepared in a solution thereof and was applied in the form of such solution. Resistance to delamination upon exposure to water or lower alkanol above room temperature and even at boiling temperature thereof is notable in the composite or laminated products of this invention.

Compositions suitable for either (or both) the substrate or the foil to be applied thereto include, in addition to the cellulosic materials mentioned above, synthetic organic polymers, such as polyamide (e.g., 6, 66, and other nylons and their copolymers or interpolymers), polyester (e.g., polyethylene terephthalate), and polyolefin (e.g., polyethylene, polypropylene); three-dimensional elastomeric polymers, such as acrylonitrile-butadiene-styrene rubbers, and cellular or foamed elastomer (e.g., polyurethane); metals and their alloys (e.g., aluminum, copper, steel); and glass and ceramics. Although for convenience one of the materials to be bonded is considered the substrate, it is apparent that in many instances it will be in foil form and that the other foil material may be considered the substrate instead, whereupon the partially cross-linked polyalkylenimine of this invention may be deposited on either (or in some instances, on both) of the materials, before joining them.

Other polyalkylenimines similarly formaldehyde-modified, such as those mentioned above as pigment-retention agents, also are useful as anchoring agents in like manner as formaldehyde-modified PEI although the latter is preferred for use with the more usual materials, for economy and other reasons.

Example 5

The dissolved PEI reaction product of Example 1 was coated on a glass slide and dried thereon at ordinary room temperature and was stored at about 25° C. for some weeks. The resulting solid coating was clear, continuous, hard, non-tacky, and the solution from which it was prepared remained stable, as shown by the following Saybolt-Furol viscosity data: 114 secs. upon preparation, 128 secs. after one week, and 115 secs. after two weeks.

Example 6

A solution of 225 parts 10% formaldehyde was added to a solution composed of 1290 parts 10% aqueous solution of PEI and 75 parts 12% solution of hydrochloric acid. The resulting solution was homogeneous and remained so upon being diluted to 10% solids concentration by addition of aqueous isopropanol having a maximum concentration of 75% isopropanol. The dilute solution was employed as an anchoring agent for the bonding of polyethylene film to cellophane, being applied by a gravure roll. The resulting composite or laminated article showed greatly improved resistance to delamination, as compared to a similar product made using unmodified PEI as the anchor coating, upon extended immersion in water.

While the invention has been described and exemplified above, it will be apparent that persons skilled in the art may make modifications therein while retaining all or many of the advantages of the invention, which is defined only in the following claims.

The claimed invention:

1. An anchoring agent for bonding pigments and polyolefins to cellulosic materials comprising a polyalkylene imine reacted with formaldehyde, as a cross-linking agent, together with an inorganic acid, said formaldehyde being employed in an amount sufficient to react with from about one-half to three-quarters of the —NH— groups in said polyalkylene imine.

2. The anchoring agent of claim 1 wherein said polyalkylene imine is polyethylene imine.

3. A method for preparing a cellulosic fibrous material of improved pigment retention comprising:
   (1) forming an aqueous acidic slurry of cellulosic fibers;
   (2) adding to said cellulosic fibrous slurry a pigment;
   (3) adding to said pigment-cellulosic fiber slurry, as an anchoring agent, a polyalkylene imine cross-linked with formaldehyde, together with an inorganic acid, in an amount of sufficient to react with from one-half to three-quarters of the —NH— groups in said polyalkylene imine; and
   (4) forming a pigmented cellulosic fibrous article from said slurry.

4. The method of claim 3 wherein said polyalkylene imine is polyethylene imine.

5. The method of claim 3 wherein said cellulosic fibrous article is paper.

6. A cellulosic fibrous material having improved pigment retention consisting essentially of a cellulosic fibrous base, pigment, and as a pigment retaining agent, a polyethylene imine reacted with formaldehyde, as a cross-linking agent, together with an inorganic acid, said formaldehyde being employed in an amount sufficient to react with from one-half to three-quarters of the —NH— groups in said polyethylene imine.

7. A laminate of improved adhesiveness consisting essentially of a cellulosic base sheet, a polyolefin layer bonded to said base sheet, and, as an adhesive layer, a polyethylene imine reacted with formaldehyde, together with an inorganic acid, said formaldehyde being employed in an amount sufficient to react with from one-half to three-quarters of the —NH— groups in said polyalkylene imine.

References Cited

UNITED STATES PATENTS

| | | | |
|---|---|---|---|
| 2,272,489 | 2/1942 | Ulrich | 260—2 |
| 2,296,225 | 9/1942 | Ulrich | 260—2 |
| 2,849,411 | 8/1958 | Lehmann | 260—2 |
| 2,999,782 | 9/1961 | Justice et al. | 161—270 X |
| 3,267,054 | 8/1966 | Abere | 162—168 X |
| 3,325,346 | 6/1967 | Osborg | 162—164 |

FOREIGN PATENTS

| | | |
|---|---|---|
| 996,388 | 6/1965 | Great Britain. |
| 467,655 | 12/1951 | Italy. |

S. LEON BASHORE, *Primary Examiner.*

U.S. Cl. X.R.

162—183; 260—37; 161—270; 117—155